(12) United States Patent
Longaker et al.

(10) Patent No.: US 6,218,984 B1
(45) Date of Patent: Apr. 17, 2001

(54) GEO-REFERENCING RADIO POSITION DETERMINATION SYSTEMS USING CO-LOCATED ANTENNAS

(75) Inventors: Harold Lewis Longaker, Houston, TX (US); Leonid Sheynblat, Belmont; Nancy Nelson, San Jose, both of CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/216,009

(22) Filed: Dec. 17, 1998

(51) Int. Cl.$^7$ .............................. G01S 5/02; H04B 7/185; G06G 7/78; H04Q 7/20
(52) U.S. Cl. ............................... 342/357.14; 342/357.08; 455/427; 701/226
(58) Field of Search ...................... 342/357.02, 357.06, 342/357.08, 357.11, 357, 14, 357.1; 701/226; 455/427, 428, 429, 430; 343/904, 905, 906, 720, 700 MS

(56) References Cited

U.S. PATENT DOCUMENTS

| | | | |
|---|---|---|---|
| 5,235,633 | * | 8/1993 | Dennison et al. ............... 455/456 |
| 5,691,726 | * | 11/1997 | Nichols et al. ................ 342/357.1 |
| 5,935,196 | * | 8/1999 | Brodie et al. ..................... 701/226 |
| 6,018,659 | * | 1/2000 | Ayyagari et al. ................ 455/431 |

\* cited by examiner

Primary Examiner—Thomas H. Tarcza
Assistant Examiner—Fred H. Mull
(74) Attorney, Agent, or Firm—Blakely, Sokoloff, Taylor & Zafman LLP

(57) ABSTRACT

The present invention is a method and apparatus for establishing a common datum georeferenced position of the phase centers of the antennas used by a system. The system includes a GPS receiver and an auxiliary transmitter. An auxiliary antenna of the auxiliary transmitter is co-located with a GPS antenna of the GPS receiver. The auxiliary antenna is at a known spatial relationship with the GPS antenna. An auxiliary position of the auxiliary antenna is determined based on the known spatial relationship.

12 Claims, 4 Drawing Sheets

GEO-REFERENCING RADIO POSITION DETERMINATION SYSTEMS USING CO-LOCATED ANTENNAS

BACKGROUND

1. Field of the Invention

This invention relates to radio position determination systems. In particular, the invention relates to geo-referencing the phase centers of antennas of different radio positioning systems that are being concurrently used.

2. Description of Related Art

The Global Positioning System (GPS) is a type of radio position determination system. The GPS is designed to provide users with position solutions on a worldwide, 24-hour-per day basis. However, there are occasions when the GPS by itself is not sufficient for a given task. For example, when the user's view of the sky is limited due to trees or other objects, the user may not be able to see a sufficient number of satellites for obtaining a position solution. For these and other reasons, it is desirable to augment the GPS with auxiliary positioning signals that use radio determination principles.

Whenever there is more than one radio determination system being used the position of all the antennas must be known in a common reference coordinate system (datum). Ranging information or lines of position from sources having different datums have to have the datums transformed to a common datum before they become usable. Consequently when lines of positions from auxiliary sources are used with lines of positions from GPS satellites the antenna phase centers of the auxiliary sources must be known in the datum of the GPS or WGS-84.

These auxiliary ranging signals may take several forms. For example they could be signals from a ground based transmitter which transmits GPS-like signals. Such a system is termed a pseudolite. With a pseudolite, the GPS-like signals could be directly tracked by a GPS receiver, thereby providing an extra line of position to the GPS receiver. There are forms other that pseudolites that can be used to augment GPS.

Augmentation of one radio determination system by another does not have to include GPS. For example, a Del Norte Trisponder system could be used to augment a Sercel Syledis system. In this case the location of the Trisponder antennas would have to be known in the same datum as that used by the Syledis.

As stated, if the GPS system is to be augmented by another radio determination system the auxiliary system will have to be referenced to the same geodetic datum as the GPS for it to be usable. For ground based transmitters this entails placing the antennas of the auxiliary system at a surveyed points whose coordinates are referenced to the GPS datum, the WGS-84.

For satellite or other unstable platforms having the antenna of an auxiliary system to be used with the GPS, the auxiliary antennas have to be radio positioned in real time with the coordinates of the positioning system known in the WGS-84 datum.

There are several ways to reference or know the location of an antenna providing auxiliary signals. It can be referenced to a local grid on a local datum, to a local grid on a local tangent plane or to any number of datums, grids and projections including the WGS-84 datum. There are several well-known survey methods for establishing the point of reference of the auxiliary antenna but the frame of reference of the phase center of the auxiliary antenna must be in the same datum as the phase center of the antenna of the system it is augmenting.

If the auxiliary antenna is to be a permanent installation then it is possible to use conventional techniques to establish its location in a datum including the WGS-84. Unfortunately, there are many cases where the location of the auxiliary antenna will be of an ad hoc nature. For example in an open pit mine the location of the auxiliary antennas could be expected to change on a weekly basis. For these cases the repeated surveying in of antenna locations becomes a costly chore.

Similarly, for situations where the auxiliary antenna is on an unstable platform, such as a satellite, there are well-known but costly techniques of determining, in real-time, the location of the antenna on such a platform.

Therefore there is a need in the technology to provide a simple and unambiguous method to determine the positions of the phase centers of antennas which augment radio determination systems, such as those augmenting the GPS, within the same datum used by the system being augmented.

SUMMARY

The present invention is a method and apparatus for establishing in a common datum the position of the phase centers of the antennas being used by a system comprised of at least one radio determination system. For the case of an auxiliary system being used with the GPS, the antenna of the auxiliary transmitter is co-located with a known spatial relationship to a GPS antenna of a GPS receiver. Having the auxiliary antenna with a known spatial relationship to a GPS antenna enables a simple means to determine its coordinate value in the same datum as the GPS.

In one embodiment, the auxiliary antenna and the GPS antenna are combined into a common antenna. In another embodiment, the auxiliary antenna is located at a predetermined location relative to the GPS antenna.

BRIEF DESCRIPTION OF THE DRAWINGS

The features and advantages of the present invention will become apparent from the following detailed description of the present invention in which.

DESCRIPTION

The present invention is a method and apparatus for establishing a common datum, geo-referenced radio position determination system when two or more different systems are used. The technique includes co-locating with a known geometrical relationship, the auxiliary antenna with the antenna of the system being augmented. In a stable platform, the two antennae may be separated by a predetermined distance and orientation or attitude of one to the other. In an unstable platform, in addition to a predetermined distance, an attitude-determining device may be used to determine the relative orientation of the two antennas. Once the position of a co-located referencing antenna is known, the position of the auxiliary antenna can be derived. The technique provides an unambiguous determination of the auxiliary antenna in the same datum as the system being augmented.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
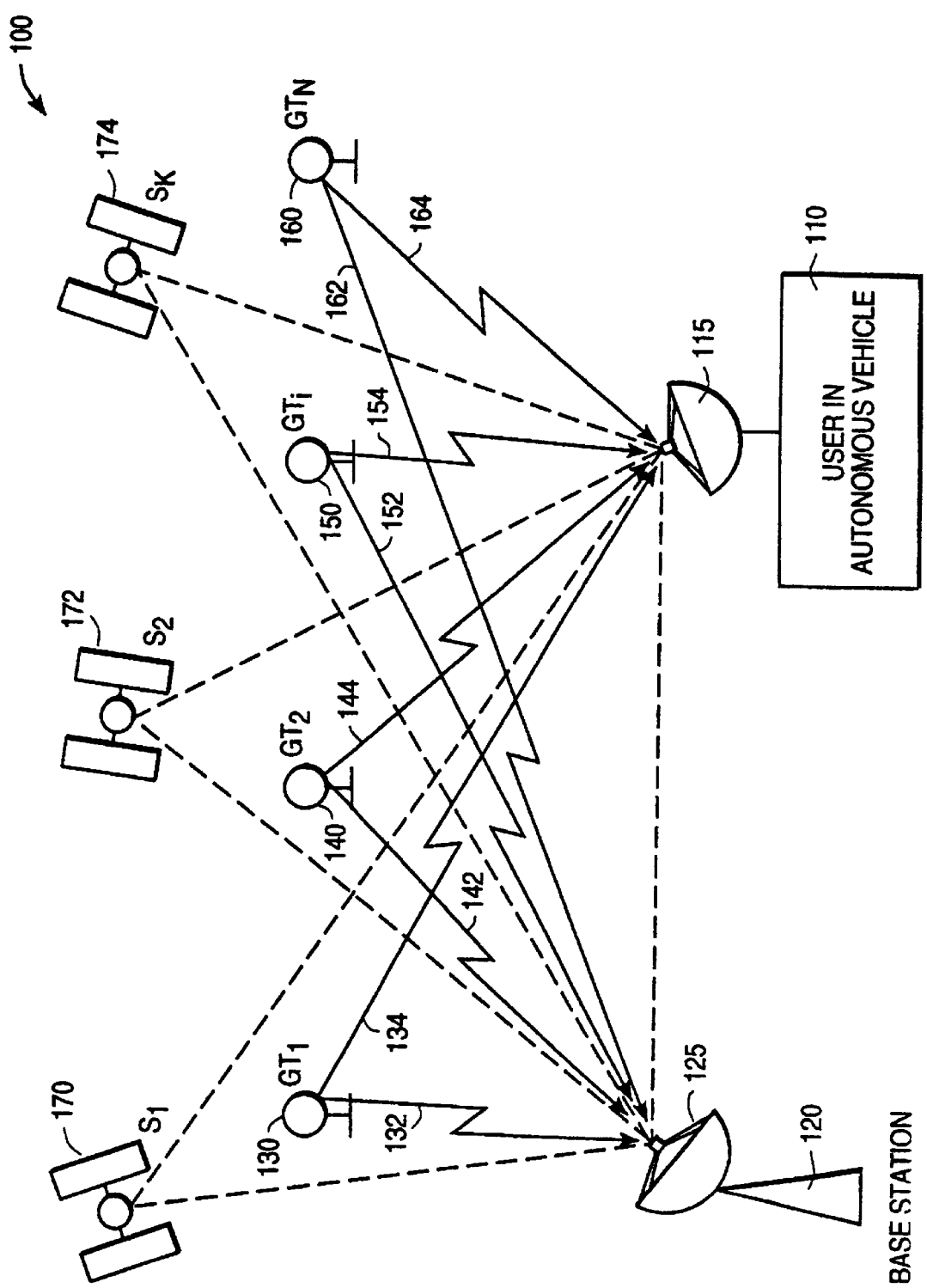
FIG. 1 is a diagram illustrating a system in which one embodiment of the invention can be practiced.

FIG. 1 is a diagram illustrating a system 100 comprising more than one radio determination system. The system 100 includes a user 110, a base station 120, N ground transmitters $GT_1$ 130, $GT_2$ 140, $GT_i$ 150, and $GT_N$ 160, and K satellites $S_1$ 170, $S_2$ 172, and $S_K$ 174.

The user 110 is in an autonomous vehicle, having a user receiver antenna 115 to receive the satellite signals from K satellites 170, 172, and 174, and the signals from the N ground transmitters 130, 140, 150, and 160. The user 110 has a limited visibility of the sky. The base station 120, having a base antenna 125, receives the satellite signals from the K satellites 170, 172, and 174, and the N ground transmitters 130, 140, 150, and 160. The base station 120 provides differential corrections for the ground transmitter signals and for the satellites. The base station 120 is at a known and/or surveyed location.

The ground transmitters 130, 140, 150, and 160 transmit pseudolite signals to the user 110 and the base station 120 via paths 132, 142, 152, and 162, and 134, 144, 154, and 164, respectively. The ground transmitters 130, 140, 150, and 160 are at known and/or surveyed locations. These locations are in the same datum as the satellites and the base station.

Figure 2:
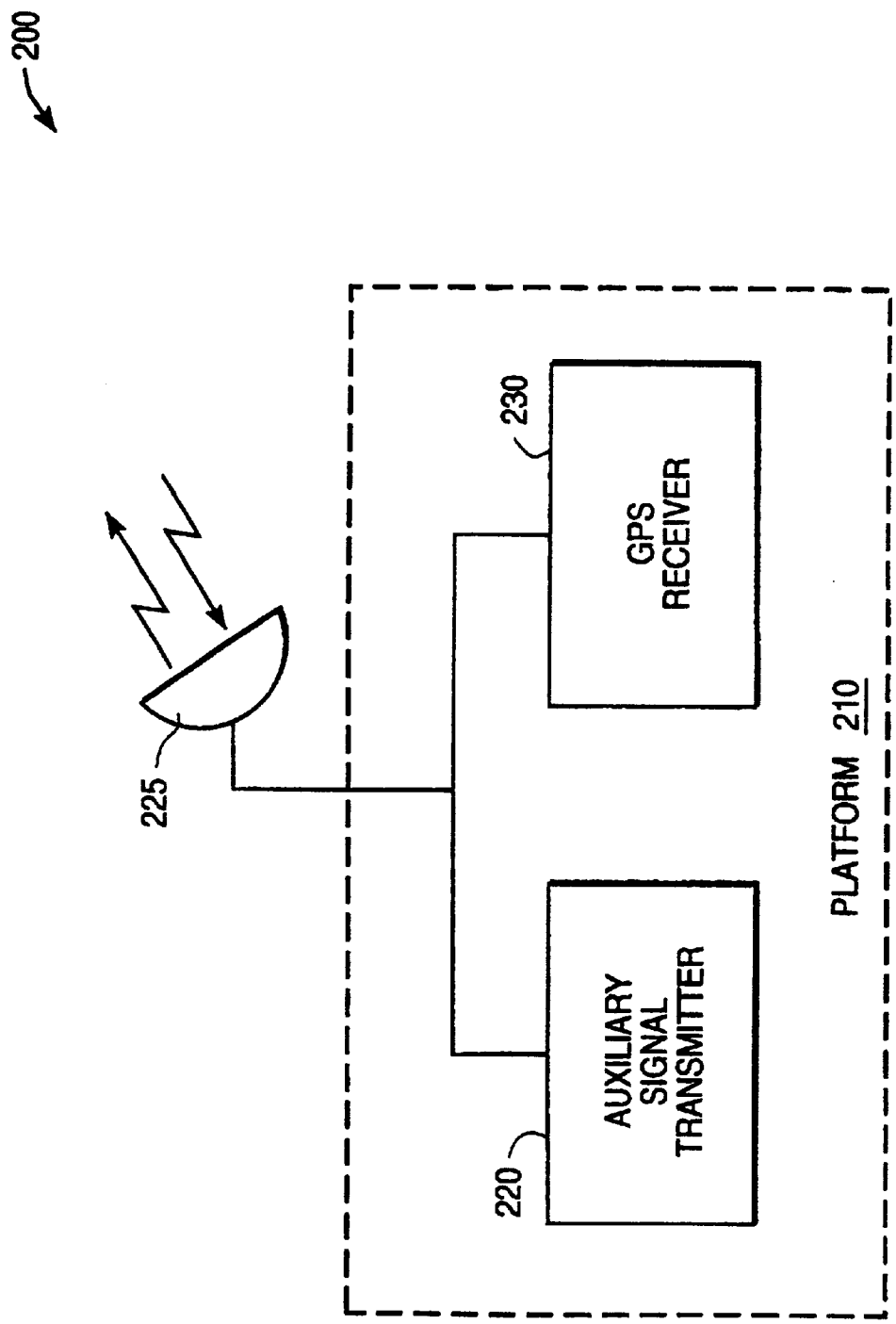
FIG. 2 is a diagram illustrating a co-locating system using a common antenna according to one embodiment of the invention.

FIG. 2 is a diagram illustrating a co-locating system 200 using a common antenna according to one embodiment of the invention. The system 200 includes an auxiliary signal transmitter 220, a GPS receiver 230, and a common antenna 225. The auxiliary signal transmitter 220 and the GPS receiver 230 are located at a platform 210.

The auxiliary signal transmitter 220 generates the auxiliary or augmenting signals via a common antenna 225. The GPS receiver 230 receives the GPS signals via the common antenna 225. The common antenna 225 is used for both transmitter and receiver. Since the common antenna 225 is used by both the auxiliary signal transmitter 220 and the GPS receiver 230, the coordinates of the auxiliary antenna are the same as the coordinates of the GPS antenna. Therefore the position of the auxiliary antenna can be determined accurately and easily in the GPS datum by simply determining the coordinates of the GPS antenna using conventional GPS techniques.

Figure 3:
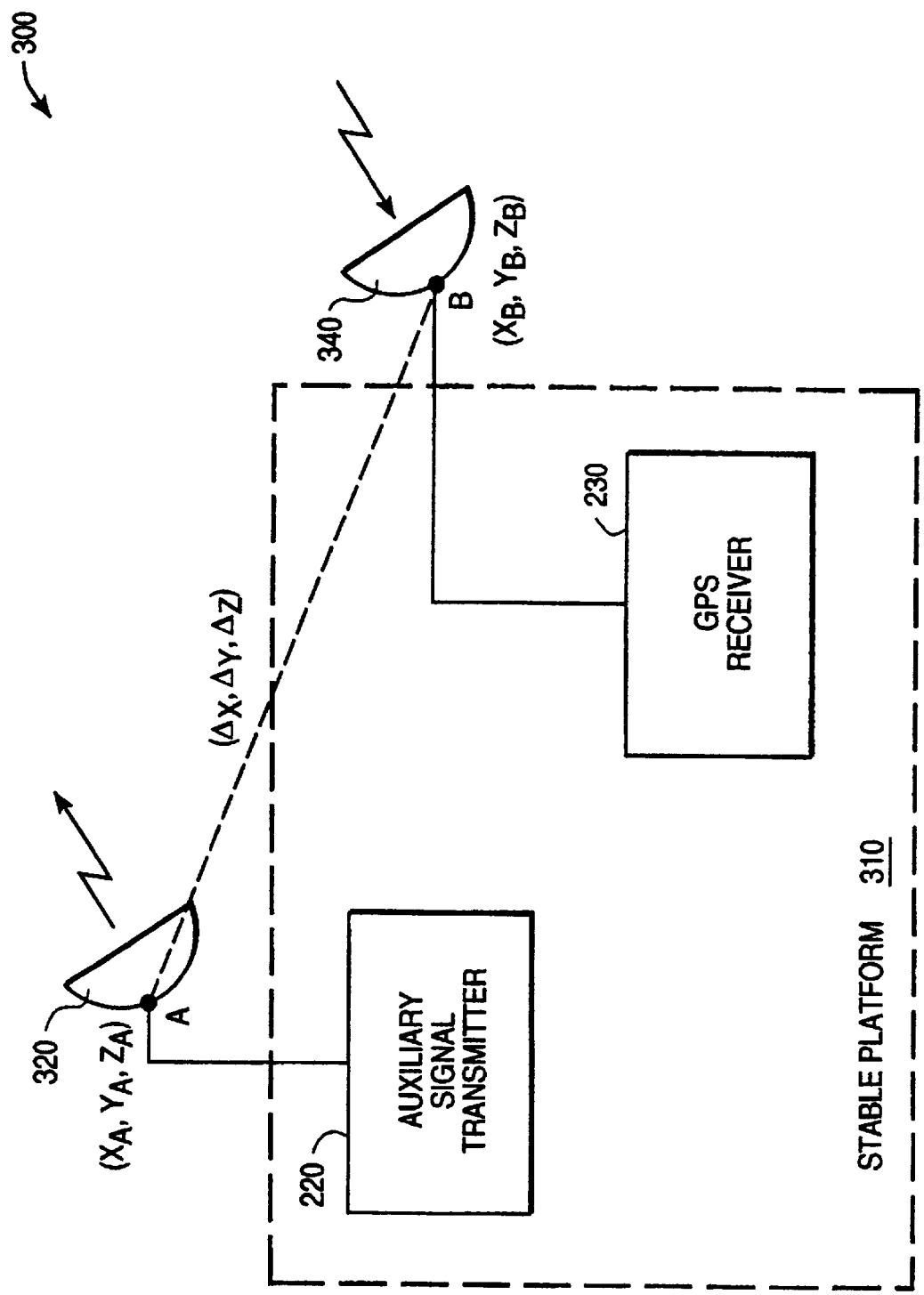
FIG. 3 is a diagram illustrating a co-locating system on a stable platform according to one embodiment of the invention.

FIG. 3 is a diagram illustrating a co-locating system 300 on a stable platform according to one embodiment of the invention. In this system there are two separate antennas. The system 300 includes a stable platform 310.

The stable platform 310 is an integrated structure. In one embodiment the stable platform is located on the ground. The stable platform 310 includes the auxiliary signal transmitter 220 and a GPS receiver 230.

The auxiliary signal transmitter 220 provides the auxiliary or augmenting signals. The auxiliary signal transmitter 220 transmits signals via an auxiliary antenna 320 located at a position A. The position A has coordinates $(x_A, y_A, z_A)$. The GPS receiver 230 receives and processes GPS signals. The GPS receiver receives signals via a GPS antenna 340 located at a position B. The position B has coordinates $(x_B, y_B, z_B)$.

In one embodiment, the relative positions between the auxiliary antenna 320 and the GPS antenna 340 are known. In other words, the differences between the two coordinates are known in advance as follows:

$$\Delta x = x_B - x_A, \Delta y = y_B - y_A, \Delta z = z_B - z_A$$

This can be achieved in a number of ways. One way is to place the GPS antenna 340 at a known distance and directly above the auxiliary antenna 320 in the same structure. Another way is to place the GPS antenna 340 at a fixed range and bearing from the auxiliary antenna 320. The relative positions between the two antennas can then be derived using well-known geometrical computations.

Figure 4:
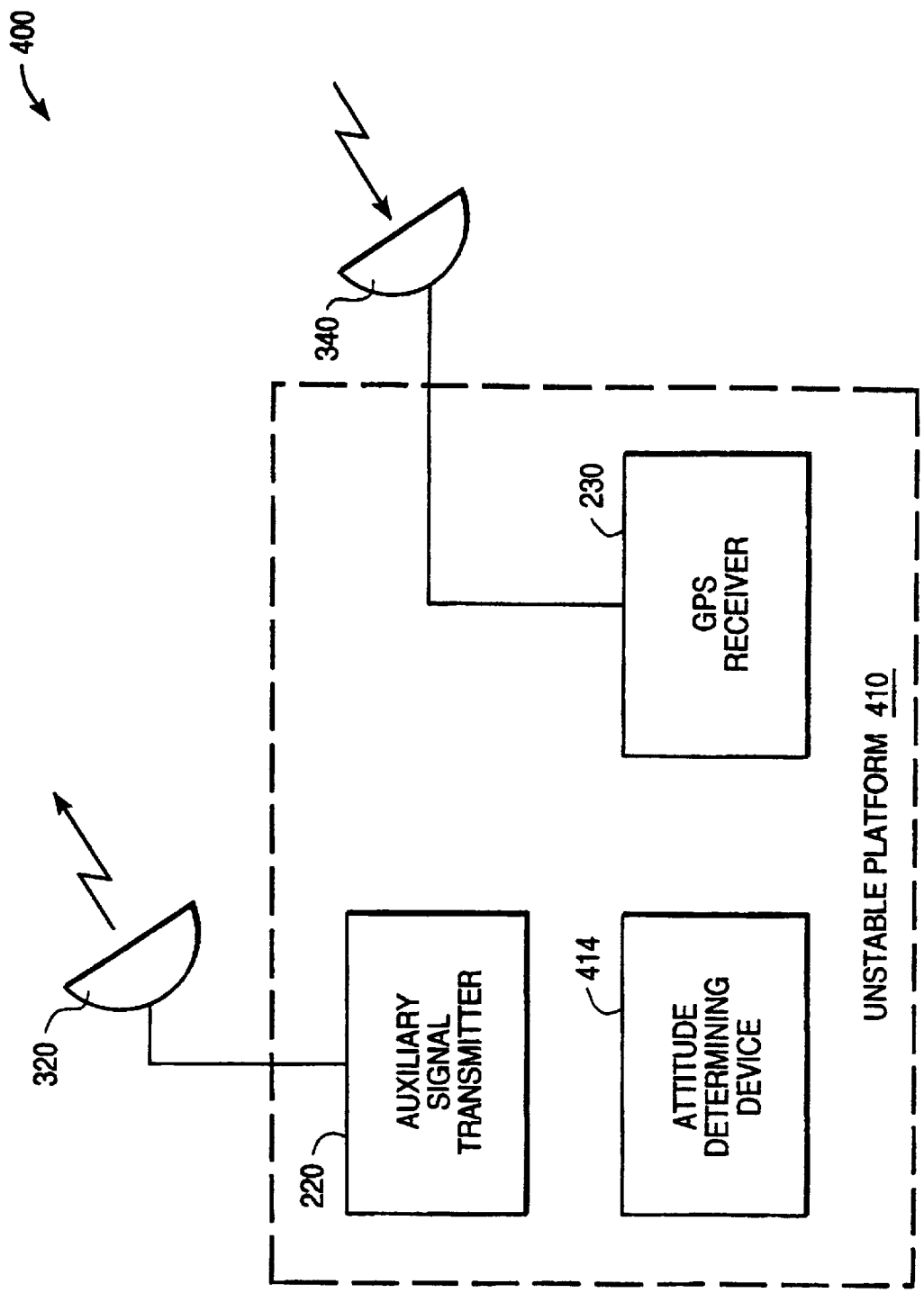
FIG. 4 is a diagram illustrating a co-locating system on an unstable platform according to one embodiment of the invention.

FIG. 4 is a diagram illustrating a co-locating system 400 on an unstable platform according to one embodiment of the invention. The co-locating system 400 includes an unstable platform 410.

The unstable platform 410 may be a moving platform such as a satellite or some other platform whose coordinates may not be determined or known in advance. The unstable platform 410 includes the GPS receiver 230 and the auxiliary signal transmitter 220 which transmits the pseudolite signals via the auxiliary antenna 320. The GPS receiver 230 receives the GPS signals via the GPS antenna 340. The unstable platform 410 also includes an attitude determining device 414. The attitude determining device 414 is a device to allow the determinations of the relative position between the auxiliary antenna 320 and the GPS antenna 340.

When the coordinates of the GPS antenna 340 are determined using the GPS conventional technique, the coordinates of the auxiliary antenna 320 are determined based on the information provided by the attitude determining device. The attitude determining device 414 provides the attitude of the auxiliary antenna 320 on a real-time basis. Therefore the attitude information is continuously available.

The present invention provides a simple and efficient technique to determine the geo-referencing positions. The technique uses a co-locating system having an auxiliary antenna located at a known distance with the GPS antenna. The technique provides an unambiguous means to determine the coordinates of the auxiliary antenna in the same datum as the GPS datum.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   co-locating an auxiliary antenna of an auxiliary transmitter at a known spatial relationship with a Global Positioning System (GPS) antenna of a GPS receiver; and
   determining an auxiliary position of the auxiliary antenna based on the known spatial relationship.

2. The method of claim 1 wherein co-locating comprises:
   using a common antenna for the auxiliary transmitter and the GPS receiver.

3. The method of claim 1 wherein co-locating comprises:
   placing the auxiliary antenna at a predetermined location relative to the GPS antenna.

4. The method of claim 1 wherein co-locating comprises:
placing auxiliary transmitter and the auxiliary antenna in a moving platform.

5. The method of claim 4 wherein the moving platform is a satellite.

6. The method of claim 1 wherein the known spatial relationship includes a predetermined distance and relative attitude.

7. An apparatus comprising:

a Global Positioning System (GPS) receiver for receiving GPS signals via a GPS antenna;

an auxiliary transmitter for transmitting auxiliary signals via an auxiliary antenna, the auxiliary antenna being co-located at a known spatial relationship with the GPS antenna of the GPS receiver; and wherein an auxiliary position of the auxiliary antenna is determined based on the known spatial relationship.

8. The apparatus of claim 7 wherein the GPS antenna and the auxiliary antenna are combined into a common antenna.

9. The apparatus of claim 7 wherein the auxiliary antenna is placed at a predetermined location relative to the GPS antenna.

10. The apparatus of claim 7 wherein the auxiliary transmitter and the auxiliary antenna are placed in a moving platform.

11. The apparatus of claim 10 wherein the moving platform is a satellite.

12. The apparatus of claim 7 further comprises:

an attitude determining device for determining the spatial relationship.

* * * * *